United States Patent [19]

Nilsson

[11] Patent Number: 4,754,369
[45] Date of Patent: Jun. 28, 1988

[54] CABINET OF A PARTICULARLY LIGHT AND STIFF CONSTRUCTION

[75] Inventor: Gustaf B. I. Nilsson, Tumba, Sweden

[73] Assignee: Telefonaktiebolaget L M Ericsson, Stockholm, Sweden

[21] Appl. No.: 30,866

[22] PCT Filed: Jun. 6, 1986

[86] PCT No.: PCT/SE86/00273

§ 371 Date: Feb. 26, 1987

§ 102(e) Date: Feb. 26, 1987

[87] PCT Pub. No.: WO87/00357

PCT Pub. Date: Jan. 15, 1987

[30] Foreign Application Priority Data

Jun. 28, 1985 [SE] Sweden .................... 8503233

[51] Int. Cl.⁴ .............................................. H05K 5/02
[52] U.S. Cl. .............................. 361/390; 312/257 SM; 312/257 R
[58] Field of Search .................... 312/257 A–257 R, 312/263–265; 361/390, 356, 428, 429

[56] References Cited

U.S. PATENT DOCUMENTS

| | | | |
|---|---|---|---|
| 2,127,111 | 8/1938 | Gaenzle | 312/257 R |
| 2,225,958 | 12/1940 | Mandel | 312/257 R |
| 3,564,112 | 2/1971 | Algotsson | 361/356 |
| 3,846,002 | 11/1976 | Floetotto | 312/257 R |
| 3,966,285 | 6/1976 | Porch et al. | 312/257 R |
| 4,077,686 | 3/1978 | Bukaitz | 312/257 SM |

FOREIGN PATENT DOCUMENTS

| | | | |
|---|---|---|---|
| 0241821 | 11/1962 | Australia | 312/257 R |
| 1249478 | 9/1967 | Fed. Rep. of Germany | 312/257 R |
| 2043699 | 3/1972 | Fed. Rep. of Germany | 361/429 |
| 2157761 | 5/1973 | Fed. Rep. of Germany | 312/257 R |
| 1088660 | 3/1955 | France | 312/257 R |
| 0276412 | 8/1927 | United Kingdom | 312/257 R |

*Primary Examiner*—A. D. Pellinen
*Assistant Examiner*—Gregory D. Thompson
*Attorney, Agent, or Firm*—Burns, Doane, Swecker & Mathis

[57] ABSTRACT

A cabinet for use with electrical equipment and the like is fabricated as a particularly lightweight and stiff structure and includes a bottom flat frame part and a top flat frame part. Upstanding fastening cleats are rigidly attached to short sides of the frame parts at right angles to the planes of the frame parts. Two box-section end walls having open top and bottom ends are positioned over the cleats and are removably fastened thereto. The sheet material of the fastening cleats is corrugated. The corrugations are directed to right angles to the plane of the frame parts for engagement with the interior and exterior sheets of the end walls.

2 Claims, 1 Drawing Sheet

CABINET OF A PARTICULARLY LIGHT AND STIFF CONSTRUCTION

FIELD OF THE INVENTION

The present invention relates to a cabinet for electrical equipment, which is implemented in a particularly light weight and stiff construction.

BACKGROUND OF THE INVENTION

Cabinets for electrical equipment are usually made with a framework of steel, covered by walls of sheet metal, and having openable cabinet doors. If there is an added requirement that the cabinet be capable of withstanding large mechanical stresses, inter alia vibrations during an earthquake, the cabinet may be heavy, especially if it is large, with a height of about 2 m. If there is a further requirement that the cabinet be transportable with associated electric equipment in place, the cabinet must be made even stronger and may be even heavier. This means that all of the requirements made on the cabinet will be so contradictory that they cannot be met.

OBJECTS AND SUMMARY OF THE INVENTION

An object of the present invention is to provide a cabinet for electrical equipment, implemented in such a light weight and stiff construction as to be transportable with associated electrical equipment in place, while being at the same time resistant to specified mechanical stresses.

BRIEF DESCRIPTION OF DRAWINGS

An embodiment of a cabinet constructed in accordance with the invention is described as an example in the following description, with reference to the accompanying drawings, wherein.

DETAILED DESCRIPTION OF A PREFERRED EMBODIMENT

Figure 1:
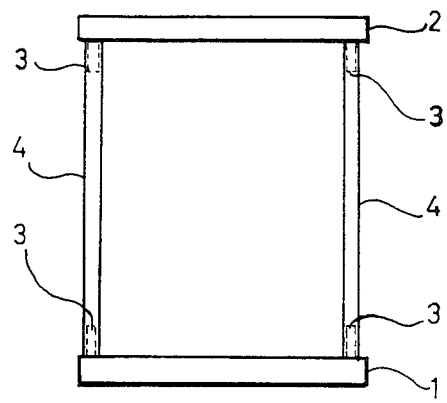
FIG. 1 is a front view of a preferred embodiment of the inventive cabinet.

The exemplifying cabinet in accordance with the invention, as will be seen from FIG. 1, is fabricated with a flat frame part 1 as its bottom, and with a similar frame part 2 as its top. Upstanding fastening cleats 3 are welded to each short side of both frame parts 1, 2 at right angles to the plane of the respective parts. Two box-section end walls 4, which are open at bottom and top, are placed over the cleats 3 and are removably fastened thereto.

Figure 2:
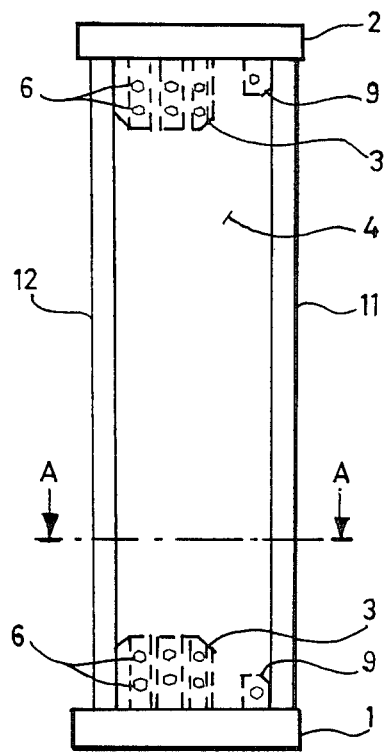
FIG. 2 is a side view illustrating one end wall of the cabinet shown in FIG. 1.
Figure 3:
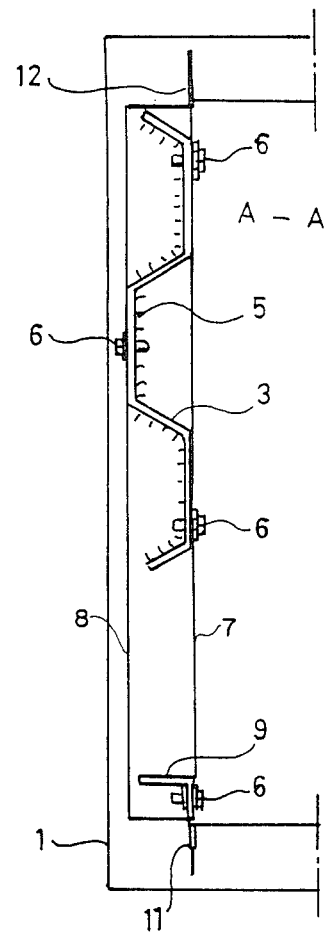
FIG. 3 is a cross sectional view of the end wall shown in FIG. 2, taken along line A—A of FIG. 2.

As will be seen from FIGS. 2 and 3, the cleats 3 are made from steel sheet material which is pressed into a corrugated configuration and welded to one of the frame parts 1, 2 with a weld 5. In the case illustrated here there are six fastening elements, captive nuts or the like 6 attached to each cleat 3. In alternative cabinet embodiments a different number of captive nuts may be used. Both box-secton end walls 4 are made up from an interior steel sheet 7 and an exterior steel sheet 8, which are welded together along the long sides of the wall. After being placed over the fastening cleats 3, the end walls 4 are screwed to them through both the interior sheet 7 and the exterior sheet 8 using the fastening elements 6 attached to the cleats.

A locating angle cleat 9 is welded to each of the short sides of the frame parts and is directed in the same direction as the cleats 3. Each of the angle cleats 9 is disposed so as to bear against one narrow side of one of the end walls 4 to locate the end wall on the respective parts 1 and 2. Each locating cleat 9 is also provided with a captive nut for a screw passing through the interior sheet 7 of the end wall.

The long sides of the box-section end walls are formed as flanges 11, 12 and to these there are fastened corner posts supporting cabinet doors etc as required. The corner posts and the cabinet doors are not shown on the drawing since they do not constitute any part of the invention.

As will be seen from FIG. 3, the weld 5 is run along each cleat 3 so that it does not prevent the end wall 4 from bearing against the frame parts 1, 2.

As an example of an implementation of a cabinet in accordance with the preferred embodiment it may be mentioned that its height is 2,100 mm, its width is 1,200 mm and is depth is 400 mm. The cleats 3 are made from 2.5 mm thick steel sheet and the end wall 4 is made from steel sheet with a thickness of 1 mm on the inside and 1.5 mm on the outside. Other dimensions are applicable to alternative forms of cabinet.

Cabinets in accordance with the invention are sufficiently light as to enable their being transported with all of their associated electrical equipment in place, and sufficiently strong to withstand specified mechanical stresses, inter alia vibrations caused by earthquakes.

What is claimed is:

1. A cabinet for electrical equipment, fabricated as a particularly lightweight and stiff structure comprising:

a bottom flat frame part having an upper surface and first and second pairs of sides, said first pair of sides being short relative to said second pair of sides;

a top flat frame part having a lower surface and third and fourth pairs of sides, said third pair of sides being short relative to said fourth pair of sides;

a plurality of corrugated fastening cleats attached to each of said upper surface and said lower surface adjacent said first and third pairs of sides, said fastening cleats extending in a direction perpendicular to planes defined by said upper and lower surfaces; and a plurality of box-section end walls, each having a top and a bottom which are open, said end walls being placed over said cleats and being removably fastened thereto.

2. A cabinet in accordance with claim 1, wherein each of said cleats is formed of corrugated sheet material having corrugations extending in a direction perpendicular to the planes defined by said upper and lower surfaces, each of said box-section end walls including an interior sheet and an exterior sheet, both of which are in engagement with said corrugations.

* * * * *